(12) United States Patent
Jung et al.

(10) Patent No.: US 10,146,412 B2
(45) Date of Patent: Dec. 4, 2018

(54) METHOD AND ELECTRONIC DEVICE FOR PROVIDING INFORMATION

(71) Applicant: SAMSUNG ELECTRONICS CO., LTD., Suwon-si, Gyeonggi-do (KR)

(72) Inventors: Jin-He Jung, Suwon-si (KR);
Min-Kyung Hwang, Seoul (KR);
Kyu-Sung Cho, Suwon-si (KR);
Ik-Hwan Cho, Suwon-si (KR);
Ji-Hyun Park, Seongnam-si (KR);
Yong-Joon Jeon, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 331 days.

(21) Appl. No.: 14/748,629

(22) Filed: Jun. 24, 2015

(65) Prior Publication Data
US 2016/0077711 A1 Mar. 17, 2016

(30) Foreign Application Priority Data
Sep. 15, 2014 (KR) .......................... 10-2014-0122111

(51) Int. Cl.
| G06F 3/0482 | (2013.01) |
| G06F 3/0484 | (2013.01) |
| G06F 3/01 | (2006.01) |
| G06Q 30/02 | (2012.01) |
| G06K 9/00 | (2006.01) |
| G06T 11/00 | (2006.01) |

(52) U.S. Cl.
CPC .......... *G06F 3/04842* (2013.01); *G06F 3/011* (2013.01); *G06F 3/04847* (2013.01); *G06K 9/00671* (2013.01); *G06Q 30/02* (2013.01); *G06T 11/00* (2013.01)

(58) Field of Classification Search
CPC ................................................... G06F 3/04842
USPC ......................................................... 715/765
See application file for complete search history.

(56) References Cited

U.S. PATENT DOCUMENTS

| 7,945,856 B2 * | 5/2011 | Leahy | G06F 3/04842 715/706 |
| 8,037,425 B2 * | 10/2011 | Lection | G06F 17/30017 707/705 |
| 8,788,972 B2 * | 7/2014 | Garrison | G06F 3/0482 345/169 |

(Continued)

FOREIGN PATENT DOCUMENTS

| KR | 2012-0026402 | 3/2012 |
| WO | 2013/145566 | 10/2013 |

OTHER PUBLICATIONS

Extended Search Report dated Feb. 5, 2016 in counterpart European Patent Application No. 15174128.7.

*Primary Examiner* — William D Titcomb
(74) *Attorney, Agent, or Firm* — Nixon & Vanderhye, P.C.

(57) ABSTRACT

According to an embodiment of the present disclosure, a method for providing information by an electronic device comprises recognizing at least one object from an image displayed on a screen of the electronic device, displaying at least one primary information item associated with the recognized object, and when at least one of the at least one primary information item is selected, displaying a secondary information item associated with the selected primary information item on the screen. Other various embodiments are also provided herein.

20 Claims, 11 Drawing Sheets

(56) References Cited

U.S. PATENT DOCUMENTS

| | | | |
|---|---|---|---|
| 8,799,799 B1* | 8/2014 | Cervelli | G06F 3/0481 |
| | | | 707/723 |
| 8,854,325 B2* | 10/2014 | Byrd | G06F 3/04883 |
| | | | 178/18.01 |
| 9,077,647 B2* | 7/2015 | Fein | G06F 3/048 |
| 9,105,126 B2* | 8/2015 | Fein | G06T 19/006 |
| 9,111,384 B2* | 8/2015 | Fein | G06T 19/006 |
| 9,141,188 B2* | 9/2015 | Fein | G06F 3/011 |
| 9,338,198 B2* | 5/2016 | Nogami | G06F 17/30905 |
| 9,424,472 B2* | 8/2016 | So | G06K 9/00671 |
| 9,671,863 B2* | 6/2017 | Fein | G06T 11/60 |
| 2010/0257195 A1 | 10/2010 | Inoue et al. | |
| 2012/0008916 A1 | 1/2012 | Lane | |
| 2012/0038668 A1 | 2/2012 | Kim et al. | |
| 2012/0062595 A1 | 3/2012 | Oh et al. | |
| 2012/0223966 A1 | 9/2012 | Lim | |
| 2013/0083064 A1 | 4/2013 | Geisner et al. | |
| 2013/0106910 A1 | 5/2013 | Sacco | |
| 2013/0127907 A1 | 5/2013 | Lee et al. | |
| 2013/0212507 A1* | 8/2013 | Fedoseyeva | G06Q 10/00 |
| | | | 715/765 |
| 2013/0222275 A1* | 8/2013 | Byrd | G06F 3/04883 |
| | | | 345/173 |
| 2013/0239031 A1* | 9/2013 | Ubillos | H04L 51/24 |
| | | | 715/765 |
| 2014/0059458 A1* | 2/2014 | Levien | G06F 3/04842 |
| | | | 715/765 |
| 2014/0146082 A1 | 5/2014 | So | |
| 2014/0173721 A1* | 6/2014 | Shenfield | G06F 3/0488 |
| | | | 726/21 |
| 2014/0188756 A1 | 7/2014 | Ponnavaikko et al. | |
| 2014/0189556 A1* | 7/2014 | Soo | G06F 3/0416 |
| | | | 715/765 |
| 2014/0282152 A1* | 9/2014 | Gong | G06F 3/0482 |
| | | | 715/765 |
| 2014/0282214 A1* | 9/2014 | Shirzadi | G06F 3/04883 |
| | | | 715/781 |
| 2014/0372914 A1* | 12/2014 | Byrd | G06F 3/04883 |
| | | | 715/760 |

* cited by examiner

METHOD AND ELECTRONIC DEVICE FOR PROVIDING INFORMATION

CROSS-REFERENCE TO RELATED APPLICATION(S)

This application claims the benefit under 35 U.S.C. § 119(a) of a Korean patent application filed in the Korean Intellectual Property Office on Sep. 15, 2014 and assigned Serial No. 10-2014-0122111, the entire disclosure of which is incorporated herein by reference.

TECHNICAL FIELD

Embodiments of the present disclosure are directed to methods and electronic devices for providing information.

BACKGROUND

Augmented reality (AR) is a live direct or indirect view of a physical, real-world environment whose elements are augmented (or supplemented) by computer-generated sensory output such as sound, video, graphics or GPS data. It is related to a more general concept called mediated reality, in which a view of reality is modified (possibly even diminished rather than augmented) by a computer. As a result, the technology functions by enhancing one's current perception of reality.

Various AR techniques are adopted by smartphones, tablet PCs, wearable devices, or other mobile devices to provide a diversity of services.

According to conventional AR-related techniques, the user needs to previously choose a target object to be recognized or information (e.g., a service) to receive in association with the object. This means that the user should be aware of information from which a result of recognition is to be obtained, when selecting the information, which is determined by individually changing the information in case the recognized object does not provide the type of information.

The above information is presented as background information only to assist with an understanding of the present disclosure. No determination has been made, and no assertion is made, as to whether any of the above might be applicable as prior art with regard to the present disclosure.

SUMMARY

According to embodiments of the present disclosure, information associated with an object recognized from an image displayed on an electronic device may be offered, enabling multi-dimensional and stage-by-stage provision of information regarding the recognized object.

According to an embodiment of the present disclosure, the electronic device may include a display displaying an image on the screen and a controller configured to recognize at least one object from an image displayed on a screen of the electronic device. The electronic device may further display at least one primary information item associated with the recognized object, and when at least one of the at least one primary information item is selected, display a secondary information item associated with the selected primary information item on the screen.

According to an embodiment of the present disclosure, a method for providing information by an electronic device may include: recognizing at least one object from an image displayed on a screen of the electronic device, displaying at least one primary information item associated with the recognized object, and when at least one of the at least one primary information item is selected, displaying a secondary information item associated with the selected primary information item on the screen.

Other aspects, advantages, and salient features of the disclosure will become apparent to those skilled in the art from the following detailed description, which, taken in conjunction with the accompanying drawings, discloses exemplary embodiments of the disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
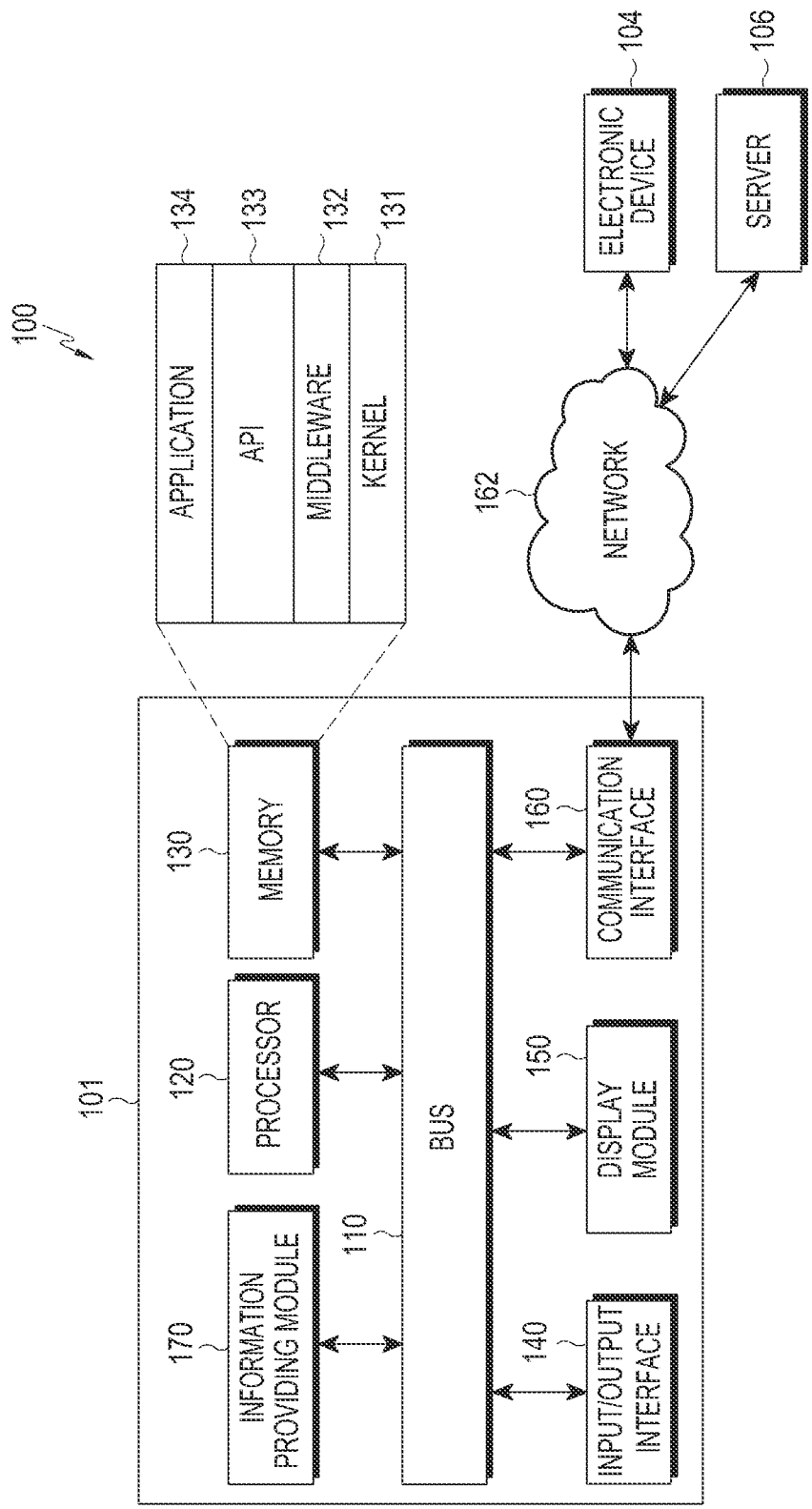
FIG. 1 is a view illustrating a network configuration according to an embodiment of the present disclosure.

Hereinafter, embodiments of the present disclosure are described in detail with reference to the accompanying drawings. Various changes may be made to the present disclosure, and the present disclosure may come with a diversity of embodiments. Some embodiments of the present disclosure are shown and described in connection with the drawings. However, it should be appreciated that the present disclosure is not limited to the embodiments, and all changes and/or equivalents or replacements thereto also belong to the scope of the present disclosure. The same or similar reference numerals are used to refer to the same or similar components throughout the specification and the drawings.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For examples, "A and/or B" may include A, or include B, or include both A and B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other. For example, a first component may be termed a second component, and vice versa without departing from the scope of the present disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some embodiments thereof, but not to limit the present disclosure. It is to be understood that the singular forms "a," "an," and "the" include plural references unless the context clearly dictates otherwise.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the terms "information" or "information item" may be interchangeably used for the purpose of description without departing from the scope of the present disclosure.

Disclosed herein are a method and electronic device for providing information associated with an object recognized from an image displayed on the electronic device, according to embodiments of the present disclosure.

According to an embodiment of the present disclosure, at least one primary information item (e.g., type of information) associated with the recognized object and a secondary information item (e.g., associated information or detailed information) corresponding to a selected primary information item may be displayed on the screen. For example, according to an embodiment of the present disclosure, information items associated with the recognized object may be displayed hierarchically or in stages to provide various effective user experiences.

According to an embodiment of the present disclosure, examples of the object recognized from the image displayed on the screen of the electronic device may include, but are not limited to, an advertisement image, a company logo, a human face, a human body, a portion of a human body, a thing carried by a human, a thing worn by a human, a building, a portion of a building, a tree, a thing fixed to a background, a movable thing, text, a texture, a gesture, or anything recognizable in the image.

According to an embodiment of the present disclosure, types of information that may be provided in association with the recognized object may include, but are not limited to, a coupon, an event, an electronic map, a dictionary search, an email, copying, calling, a short message service, a web page, navigation, or any other type of information.

According to an embodiment of the present disclosure, the electronic device may include a displaying function, but is not limited thereto. Examples of the electronic device may include, but are not limited to, smartphones, tablet PCs, mobile phones, video phones, e-book readers, desktop PCs (personal computers), laptop computers, netbook computers, PDAs (personal digital assistants), PMPs (portable multimedia players), MP3 players, mobile medical devices, cameras, or wearable devices (e.g., head-mounted devices (HMDs), electronic clothes, electronic bracelets, electronic necklaces, electronic appcessories, electronic tattoos, or smart watches).

According to an embodiment of the present disclosure, the electronic device may be a smart home appliance with a display function. Examples of the smart home appliance may include, but are not limited to, televisions, digital video disk (DVD) players, audio players, refrigerators, air conditioners, vacuum cleaners, ovens, microwave ovens, washers, driers, air cleaners, set-top boxes, TV boxes (e.g., Samsung HomeSync™, Apple TV™, or Google TV™), gaming consoles, electronic dictionaries, camcorders, or electronic picture frames.

According to various embodiments of the present disclosure, examples of the electronic device may include, but are not limited to, various medical devices (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), avionics, security devices, vehicular head units, industrial or home robots, automatic teller's machines (ATMs), or point of sales (POS) devices.

According to various embodiments of the disclosure, examples of the electronic device may include, but are not limited to, a piece of furniture with a communication function, part of a building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices or appliances. According to an embodiment of the present disclosure, the electronic device may be a flexible device. According to an embodiment of the present disclosure, the electronic device is not limited to the above-listed devices or appliances.

Various embodiments of the present disclosure are now described with reference to the accompanying drawings. As used herein, the term "user" may denote a human or another device using the electronic device.

FIG. 1 illustrates a network environment 100 including an electronic device 101 according to an embodiment of the present disclosure. Referring to FIG. 1, the electronic device 101 may include a bus 110, a processor 120, a memory 130, an input/output interface 140, a display 150, a communication interface 160, and/or an information providing module 170.

The bus 110 connects the other components to each other, and the bus 110 may carry data (e.g., control messages) between the other components.

The processor 120 may receive a command from other components (e.g., the memory 130, the input/output interface 140, the display 150, the communication interface 160, or the information providing module 170) through, e.g., the bus 110, may interpret the received command, and may execute computation or data processing according to the interpreted command.

The memory 130 may store a command or data received from other component (e.g., the input/output interface 140, the display 150, the communication interface 160, or the information providing module 170) or a command or data generated by the processor 120 or other component. The memory 130 may retain programming modules including, e.g., a kernel 131, middleware 132, an application programming interface (API) 133, or an application 134. The programming modules may be configured in software, firmware, hardware or a combination of two or more thereof.

The kernel 131 may control or manage system resources (e.g., the bus 110, the processor 120, or the memory 130) used to execute the operation or function implemented in the other programming modules, e.g., the middleware 132, the API 133 or the application 134. The kernel 131 may provide an interface that allows the middleware 132, the API 133, or the application 134 to access the individual components of the electronic device 101 to control or manage the same.

The middleware 132 may function as a relay to allow the API 133 or the application 134 to communicate data with the kernel 131. A plurality of applications 134 may be provided. The middleware 132 may control work requests received from the applications 134, e.g., by allocation the priority of using the system resources of the electronic device 101 (e.g., the bus 110, the processor 120, or the memory 130) to at least one of the plurality of applications 134.

The API 133 is an interface allowing the application 134 to control functions provided from the kernel 131 or the middleware 132. For example, the API 133 may include at least one interface or function (e.g., a command) for filing control, window control, image processing or text control.

According to an embodiment of the present disclosure, there may be provided a plurality of applications 134 including an SMS/MMS application, an email application, a calendar application, an alarm application, a heathcare application (e.g., an application for measuring exercise amount or blood sugar), or an environmental information application (e.g., an application providing atmospheric pressure, moisture, or temperature information). Additionally or alternatively, the application 134 may be an application related to information exchange between the electronic device 101 and an external electronic device (e.g., electronic device 104). Examples of the information exchange-related application may include, but are not limited to, a notification relay application for transferring specific information to the external electronic device, or a device management application for managing the external electronic device.

For example, the notification relay application may include a function for relaying notification information generated from other applications of the electronic device 101 (e.g., the SMS/MMS application, email application, healthcare application, or environmental information application) to the external electronic device (e.g., the electronic device 104). Additionally or optionally, the notification relay application may receive notification information from, e.g., the external electronic device (e.g., the electronic device 104) and may provide the received notification information to the user. The device management application may perform at least some functions of the external electronic device (e.g., the electronic device 104) communicating with the electronic device 101 (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 134 may include an application designated depending on the attribute (e.g., type of electronic device) of the external electronic device (e.g., the electronic device 104). For example, in case the external electronic device is an MP3 player, the application 134 may include an application related to playing music. Similarly, in case the external electronic device is a mobile medical device, the application 134 may include an application related to heathcare. According to an embodiment of the present disclosure, the application 134 may include an application designated to the electronic device 101 or an application received from an external electronic device (e.g., a server 106 or the electronic device 104).

According to an embodiment of the present disclosure, the application 134 may include an application related to image analysis. For example, in case the application 134 is an image analysis-related application, the application 134 may be executed by the processor 120 to recognize at least one object included in a selected image and provide various information items associated with the recognized object through the display 150. The application 134 may be executed to receive image analysis information or information items associated with the object of the image from the electronic device 104 through a network 162 and to provide the received information or information items through the display 150. Exemplary embodiments thereof are described below.

The input/output interface 140 may transfer commands or data input by the user through an input/output device (e.g., a keyboard or touchscreen) to the processor 120, the memory 130, or the communication interface 160 through, e.g., the bus 110. For example, the input/output interface 140 may provide data regarding the user's touch input through a touchscreen to the processor 120. The input/output interface 140 may output, through the input/output device (e.g., a speaker or display), commands or data received from the processor 120, the memory 130, or the communication interface 160 through, e.g., the bus 110. For example, the input/output interface 140 may output data processed by the processor 120 to the user through a speaker.

The display 150 may display, to the user, various types of information (e.g., multimedia data or text data, augmented reality images, object images, or information items) associated with a recognized object (e.g., primary information items or secondary information items). The display 150 may display at least one image, and the display 150 may display at least one information item associated with an object recognized from the displayed image.

The communication interface 160 may interface communication between the electronic device 101 and an external electronic device (e.g., the electronic device 104 or the server 106). For example, the communication interface 160 may be connected by wire or wirelessly connected with the network 162 to communicate with the external electronic device. The wireless connection may be made by various radio communication protocols, including, but not limited to, WiFi (wireless fidelity), BT (Bluetooth), NFC (near field communication), GPS (global positioning system), or a cellular communication protocol (e.g., LTE, LTE-A, CDMA, WCDMA, UMTS, WiBro or GSM). The wired connection may be made by various wired communication protocols, including, but not limited to, USB (universal serial bus), HDMI (high definition multimedia interface), RS-232 (recommended standard 232), or POTS (plain old telephone service).

According to an embodiment of the present disclosure, the network 162 may be a telecommunication network. The telecommunication network may include, for example, a computer network, the Internet, an Internet of things (IoT) network, or a telephone network. According to an embodiment of the present disclosure, protocols for communication between the electronic device 101 and the external electronic device (examples of such protocols include, but not limited to, transport layer protocol, data link layer protocol, or physical layer protocol) may be supported by the application 134, the API 133, the middleware 132, the kernel 131, or the communication interface 160.

Although FIG. 1 shows that the electronic device 101 includes the communication interface 160 to communicate with the external electronic device 104 or 106 via the network 162, the electronic device 101 may be independently operated without a separate communication function, according to an embodiment of the present disclosure.

The electronic device 101 and the external electronic device 104 may be referred to herein as a first electronic device 101 and a second electronic device 104, respectively. According to an embodiment of the present disclosure, the first electronic device 101 and the second electronic device 104 may communicate information unilaterally or bilaterally. The first electronic device 101 may be a portable electronic device such as a smartphone, and the second electronic device 104 may be a wearable device such as an optical head-mounted device or a smart watch. Alternatively, the first electronic device 101 may be a wearable device such as an optical head-mounted device or a smart watch, and the second electronic device 104 may be a portable electronic device such as a smartphone. However, embodiments of the present disclosure are not limited thereto. According to embodiments of the present disclosure, the operations or functions to be described below may be implemented in a single electronic device, and at least some functions may be offered through another electronic device or the server 106 connected via the network 162.

Figure 2:
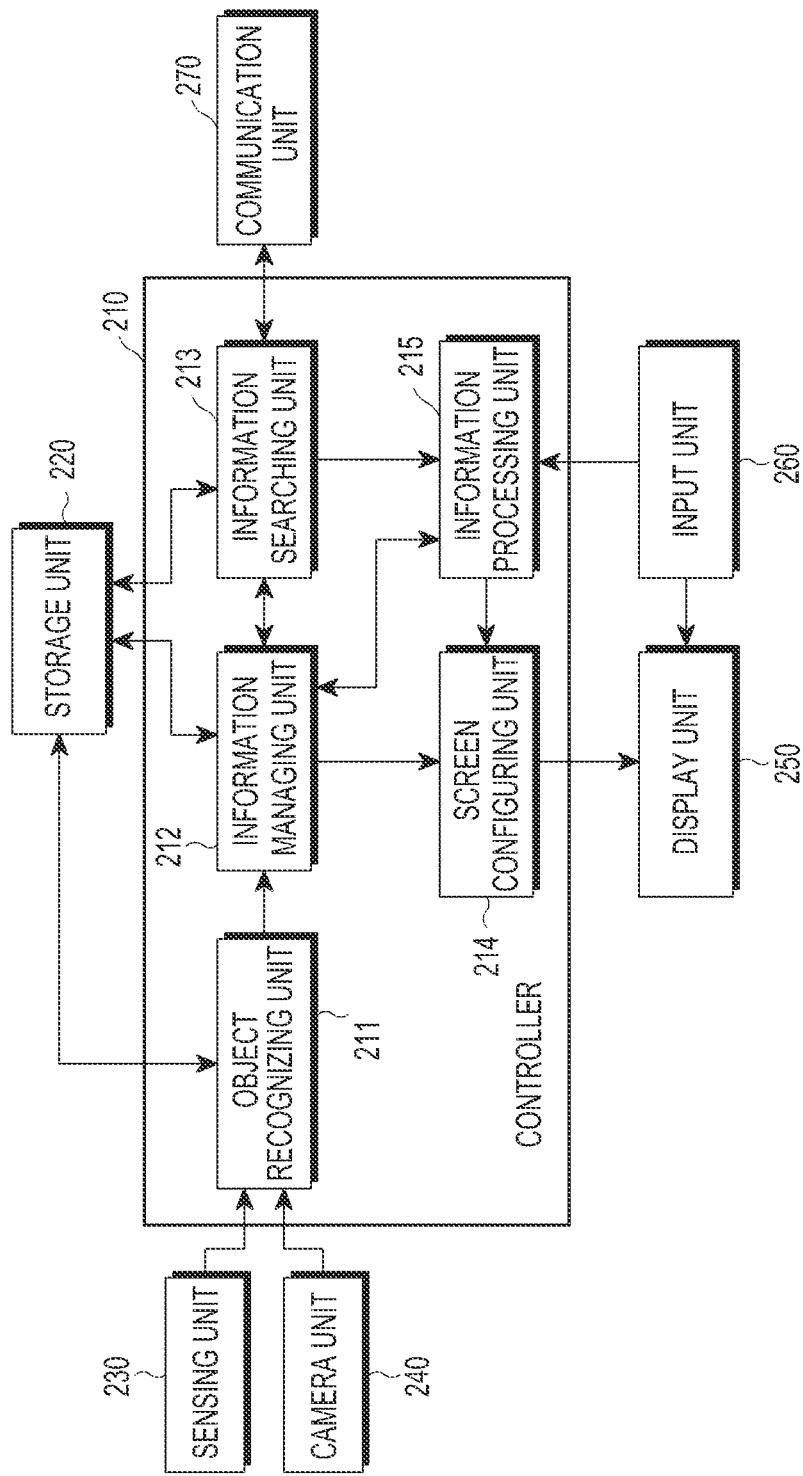
FIG. 2 is a block diagram illustrating an exemplary configuration of an electronic device according to an embodiment of the present disclosure.

FIG. 2 is a block diagram illustrating a configuration of an electronic device according to an embodiment of the present disclosure. Referring to FIG. 2, the electronic device may include a controller 210, a storage unit 220, a sensing unit 230, a camera unit 240, a display unit 250, an input unit 260, or a communication unit 270. The controller 210 may include an object recognizing unit 211, an information managing unit 212, an information searching unit 213, a screen configuring unit 214, or an information processing unit 215.

According to an embodiment of the present disclosure, an image captured by the camera unit 240 or an image stored in the storage unit 220 may be displayed through the display unit 250. According to an embodiment of the present disclosure, in such case, the object recognizing unit 211 may recognize at least one object from the image displayed on the screen.

According to an embodiment of the present disclosure, examples of the recognizable object may include, but are not limited to, an advertisement image, a company logo, a human face, a human body, a portion of a human body, a thing carried by a human, a thing worn by a human, a building, a portion of a building, a tree, a thing fixed to a background, a movable thing, text, a texture, a gesture, or anything recognizable in the image, as described herein.

According to an embodiment of the present disclosure, when at least one object is recognized by the object recognizing unit 211, the information managing unit 212 searches for information items (e.g., primary information items or secondary information items) that may be offered for the recognized object, and the information managing unit 212 may display the searched information items on the screen through the display unit 250. The information managing unit 212 may search the storage unit 220 for the information items providable for the recognized object, or the information managing unit 212 may perform the search by sending a request to the server 106 via the information searching unit 213.

The offerable information items (e.g., primary information items or secondary information items) may include, but are not limited to, a coupon, an event, an electronic map, a dictionary search, an email, copying, calling, a short message service, a web page, navigation, or any other type of information.

According to an embodiment of the present disclosure, the searched information items may be arranged on the screen by way of the screen configuring unit 214 in association with the recognized object, and in this case, at least one information item may be displayed through the display unit 250, with the information item associated with the recognized object.

According to an embodiment of the present disclosure, when a specific information item is selected by the input unit 260 from the at least one information item displayed through the display unit 250, the information processing unit 215 may provide associated information or detailed information regarding the selected information item. For example, the information processing unit 215 may search for the associated information or detailed information regarding the selected information item and/or the recognized object through the information searching unit 213, and the information processing unit 215 may display the searched information on the display unit 250.

According to an embodiment of the present disclosure, the associated information or the detailed information regarding the selected information item may be provided hierarchically or stage-wise or in stages. For ease of description, at least one information item regarding the recognized object, which is primarily displayed on the screen, is hereinafter referred to as "primary information item(s)," and associated information or detailed information regarding a selected primary information item is referred to as "secondary information item(s)." For example, a primary information item may be the type of information or a portion of information, and a secondary information item may be associated information or detailed information regarding the type of a selected primary information item. However, embodiments of the present disclosure are not limited thereto.

According to an embodiment of the present disclosure, the sensing unit 230 may include an accelerometer, a GPS module, a microphone, or other measurable means. For example, location information obtained by a GPS module, e.g., the sensing unit 230, may be a primary information item. Information sensed by the sensing unit 230 may be provided to the object recognizing unit 211 or the information managing unit 212, and the provided information may be referenced to provide a service or information relating to the recognized object.

According to an embodiment of the present disclosure, as used herein, the term "functional unit" or "module" may denote hardware or a functional or structural combination of software for driving the hardware to implement the technical spirit according to an embodiment of the present disclosure. For example, it should be appreciated by one of ordinary skill in that art that each functional unit may be a logical unit of a predetermined code and a hardware resource for executing the code, and the functional unit does not necessarily mean a physically connected code or a type of hardware.

The controller 210 of FIG. 2 may be implemented in a module provided separately from the processor 120 of FIG. 1. At least some functions of the controller 210 may be included and implemented in the processor 120. According to an embodiment of the present disclosure, all the functions of the controller 210 may be included and implemented in the processor 120 or any other processor. The controller 210 may be implemented in software or hardware. For example, the controller 210 may be implemented in the form of an application 134 that may be retained in the memory 130.

According to an embodiment of the present disclosure, the electronic device may include a display displaying an image on the screen and a controller configured to recognize at least one object from an image displayed on a screen of the electronic device, display at least one primary information item associated with the recognized object, and when at least one of the at least one primary information item is selected, display a secondary information item associated with the selected primary information item on the screen.

According to an embodiment of the present disclosure, the secondary information item may be configured in stages, such as, for example, layers, and each layer of the secondary information item, when selected, may be provided.

According to an embodiment of the present disclosure, the primary information item and the secondary information item may be simultaneously displayed on the same screen.

According to an embodiment of the present disclosure, the primary information item may include one or more items selected from a coupon, an event, an electronic map, a dictionary search, an email, copying, calling, a short message service, a web page, or navigation.

According to an embodiment of the present disclosure, the primary information item or the secondary information item may be displayed to be associated with the recognized object.

According to an embodiment of the present disclosure, the primary information item or the secondary information item may be displayed to be connected with the recognized object, for example, through a line.

According to an embodiment of the present disclosure, the primary information item or the secondary information item may be displayed to overlap at least a portion of the recognized object and the image.

According to an embodiment of the present disclosure, when two or more primary information items are simultaneously selected from a plurality of primary information items, the controller 210 may perform a control function to provide additional information items respectively associated with the selected two or more primary information items.

According to an embodiment of the present disclosure, the controller 210, when at least one of the selected two or more primary information items contain an email address, may perform a control function to transmit, to the email address, an information item corresponding to the other of the selected two or more primary information items.

According to an embodiment of the present disclosure, the controller 210 may perform a control function to determine a variation in the recognized object and to provide an information item configured corresponding to the variation in the recognized object.

Figure 3:
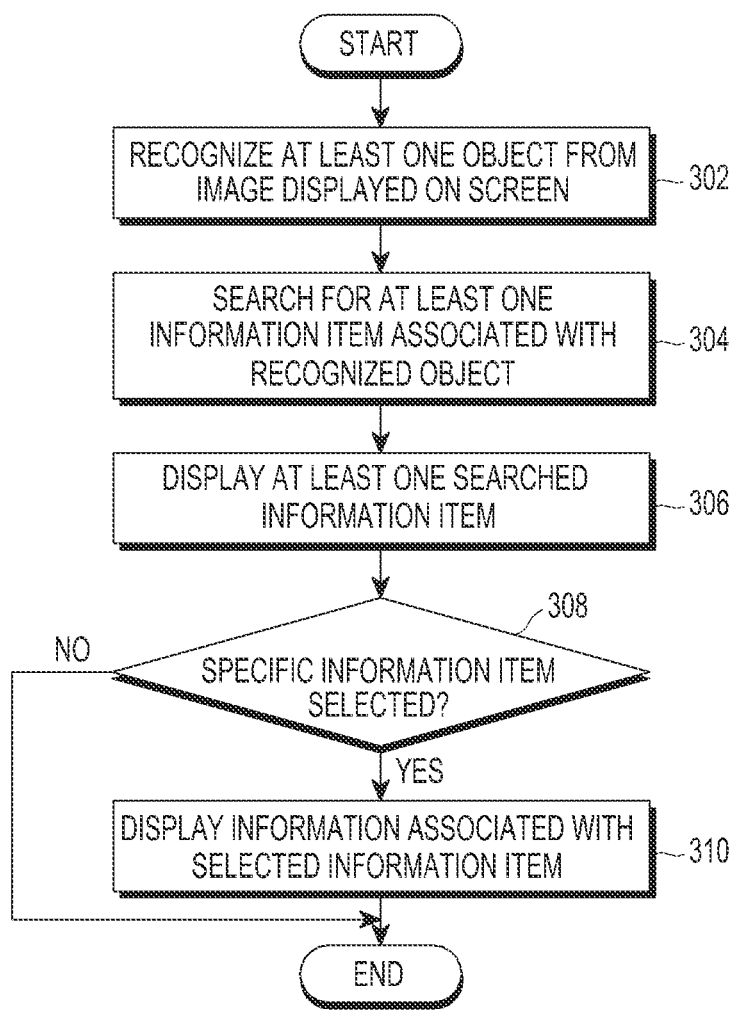
FIG. 3 is a flowchart illustrating a process of providing information by an electronic device according to an embodiment of the present disclosure.
Figure 5:
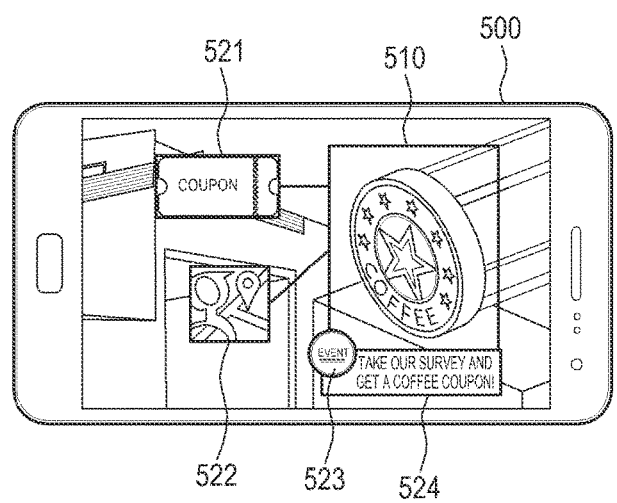
FIG. 5 is a view illustrating an example of displaying information associated with an object recognized by an electronic device according to an embodiment of the present disclosure.

FIG. 3 is a flowchart illustrating a process of providing information by an electronic device according to an embodiment of the present disclosure. Referring to FIG. 3, at least one object may be recognized from an image displayed on the screen of the display unit 250, according to an embodiment of the present disclosure (operation 302). At least one information item associated with the recognized object may be searched (operation 304), and the searched at least one information item (e.g., primary information item(s)) may be displayed on the screen (operation 306). The information item may be displayed, for example, in the form of a logo, an image, text, a picture, an animation, a sound, or a combination of two or more thereof. For example, the type of information may be displayed in the form of text (saying, e.g., "COUPON"), an image (e.g., a map image), a mark, or an icon (indicating, e.g., an event), as shown in FIG. 5.

According to an embodiment of the present disclosure, when a specific information item is selected from the at least one information item displayed (operation 308), associated information or detailed information (e.g., secondary information item(s)) regarding the selected information item may be searched and displayed on the screen (operation 310).

A method for providing information by the electronic device may be implemented in the form of programming commands executable by various computer means, and the programming commands may be recorded in a computer-readable medium. The computer-readable medium may include programming commands, data files, or data structures, alone or in combinations thereof. The programming commands recorded in the medium may be specially designed and configured for the present disclosure or may be known and available to one of ordinary skill in the computer software-related art. Examples of the computer readable recording medium may include, but are not limited to, magnetic media, such as hard disks, floppy disks or magnetic tapes, optical media, such as CD-ROMs or DVDs, magneto-optical media, such as floptical disks, memories, such as ROMs, RAMs, or flash memories, or other hardware devices specially configured to retain and execute programming commands. Examples of the programming commands may include, but are not limited to, high-level language codes executable by a computer using, e.g., an interpreter, as well as machine language codes as created by a compiler. The above-described hardware devices may be configured to operate as one or more software modules to perform operations according to an embodiment of the present disclosure, or the software modules may be configured to operate as one or more hardware modules to perform the operations.

According to an embodiment of the present disclosure, at least one of the operations shown in FIG. 3 may be omitted, and at least one other operation may be added between the operations. The operations shown in FIG. 3 may be processed in the order as shown or in different orders.

According to an embodiment of the present disclosure, a method for providing information by an electronic device may include recognizing at least one object from an image displayed on a screen of the electronic device, displaying at least one primary information item associated with the recognized object, and when at least one of the at least one primary information item is selected, displaying a secondary information item associated with the selected primary information item on the screen.

According to an embodiment of the present disclosure, the secondary information item may be configured in stages, such as, for example, in layers, and each layer of the secondary information item, when selected, may be provided.

According to an embodiment of the present disclosure, the primary information item and the secondary information item may be simultaneously displayed on the same screen.

According to an embodiment of the present disclosure, the primary information item may include, for example, one or more selected from a coupon, an event, an electronic map, a dictionary search, an email, copying, calling, a short message service, a web page, or navigation.

According to an embodiment of the present disclosure, the primary information item or the secondary information item may be displayed to be associated with the recognized object.

According to an embodiment of the present disclosure, the primary information item or the secondary information item may be displayed to be connected with the recognized object, such as, for example, through a line.

According to an embodiment of the present disclosure, the primary information item or the secondary information item may be displayed to overlap at least a portion of the recognized object and the image.

According to an embodiment of the present disclosure, the method may further include simultaneously selecting two or more primary information items from the plurality of displayed primary information items and providing additional information items respectively associated with the selected two or more primary information items.

According to an embodiment of the present disclosure, the method may further include, when at least one of the selected two or more primary information items contain an email address, transmitting, to the email address, an information item corresponding to the other of the selected two or more primary information items.

According to an embodiment of the present disclosure, the method further includes determining a variation in the recognized object and providing an information item configured corresponding to the variation in the recognized object.

Figure 4:
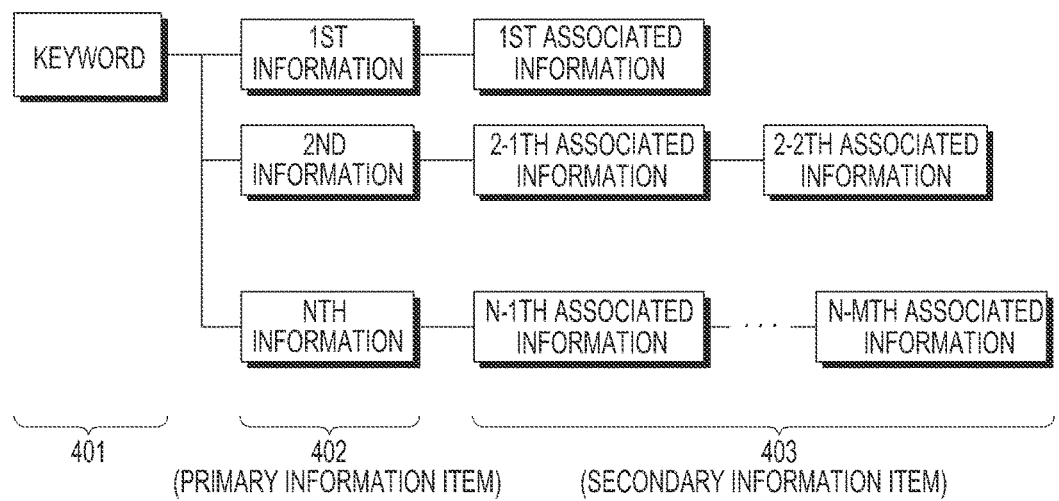
FIG. 4 is a view illustrating a hierarchical structure of information provided by an electronic device according to an embodiment of the present disclosure.

FIG. 4 is a view illustrating a hierarchical structure of information provided according to an embodiment of the present disclosure. Referring to FIG. 4, various types of primary information items 402 (e.g., type or part of information) that may be provided in association with a keyword 401 for an object recognized from an image displayed on the screen may be searched and offered.

For example, according to an embodiment of the present disclosure, in case there are first to Nth primary information items in association with the recognized object, the primary information items may be displayed in various forms on the screen in association with the recognized object. When a specific primary information item is selected from the primary information items, secondary information items 403 (e.g., associated information or detailed information) for the selected primary information item may be provided.

According to an embodiment of the present disclosure, the primary information items 402 or the secondary information items 403 may be hierarchically structured and displayed as shown in FIG. 4. For example, when the second primary information item is selected from the primary information items 402, a 2-1th associated information item may be displayed as a secondary information item. When the 2-1th associated information item is selected, a 2-2th associated information item may be displayed.

Various examples of displaying information associated with an object recognized by an electronic device are now described with reference to FIGS. 5 to 9, according to embodiments of the present disclosure.

Referring to FIG. 5, according to an embodiment of the present disclosure, in case an object recognized from an image displayed on the screen of an electronic device 500 is a coffee shop logo, primary information items that may be provided for the recognized object (e.g., type of information such as an offerable service) may be searched and displayed on the screen. For example, the information items offerable for the recognized object may include a coupon, an event notification, and a map search service, a coupon image 521, a map image 522, and an event notification icon 523 may be displayed on the screen as shown in FIG. 5. Information associated with the event notification (e.g., a title of the event notification or a main keyword) 524 may be displayed as well.

Figure 6:
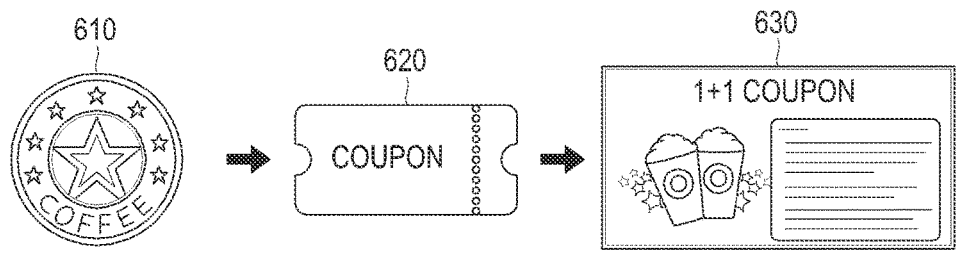
FIG. 6 is a view illustrating stage-by-stage shifts of information items provided according to an embodiment of the present disclosure.
Figure 7:
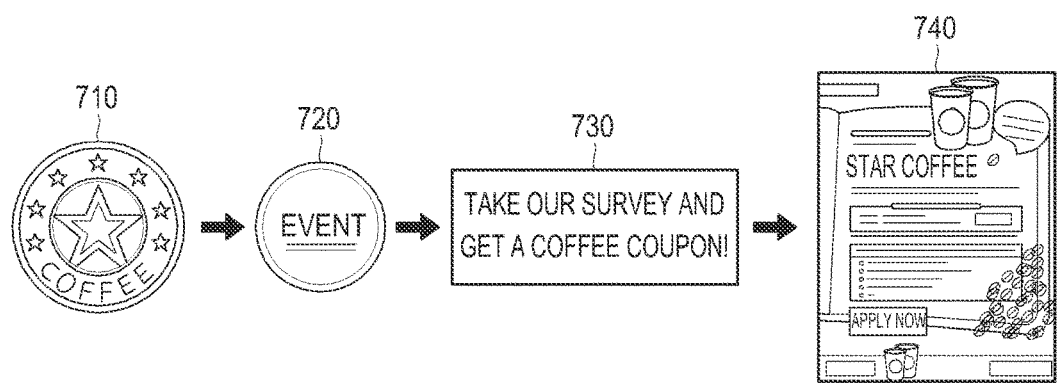
FIG. 7 is a view illustrating stage-by-stage shifts of information items provided according to an embodiment of the present disclosure.
Figure 8:
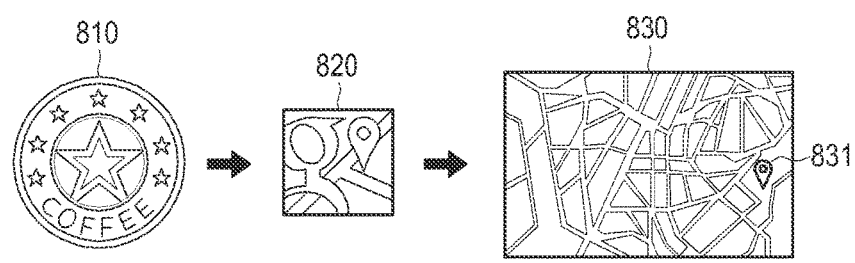
FIG. 8 is a view illustrating stage-by-stage shifts of information items provided according to an embodiment of the present disclosure.

According to an embodiment of the present disclosure, when a specific primary information item is selected from the primary information items (e.g., type of information) shown in FIG. 5, secondary information items associated with each primary information item may be stage-wise provided as shown in FIGS. 6 to 8. According to an embodiment of the present disclosure, the selection of an information item may be performed manually by the user, or depending on the characteristics of a service, such selection may be automatically done. In the case of an event service as shown in FIG. 5, the service provider might desire to display some of the hierarchical information items (e.g., secondary information item) together with the primary information item, e.g., for the purpose of advertisement. According to an embodiment of the present disclosure, the electronic device may display a specific information item along with some secondary information items (e.g., additional information item) for the specific information item depending on the settings of the user or the service provider.

Referring to FIG. 6, according to an embodiment of the present disclosure, in an example case, a recognized object is a coffee shop logo 610 and the user selects a coupon image 620 provided as a primary information item for the coffee shop logo 610, detailed information 630 regarding the coupon may be displayed on the screen as a secondary information item.

Referring to FIG. 7, according to an embodiment of the present disclosure, in an example case, a recognized object is a coffee shop logo 710 and the user selects an event image 720 provided as a primary information item for the coffee shop logo 710, brief information 730 regarding the event may be displayed on the screen as a secondary information item. When the brief information 730 is selected, more detailed event information 740 may be displayed on the screen. As such, according to the user's selection, the information items associated with the recognized object may be provided in a number of stages or stage-wise. According to an embodiment of the present disclosure, the event image 720 and the brief information 730 may be simultaneously displayed on the screen as shown in FIG. 5.

Referring to FIG. 8, according to an embodiment of the present disclosure, in an example case, a recognized object is a coffee shop logo 810 and the user selects an electronic map icon 820 provided as a primary information item for the coffee shop logo 810, an electronic map 830 on which the location 831 of the coffee shop is pinpointed may be displayed on the screen as a secondary information item.

Referring to FIGS. 6 to 8, according to an embodiment of the present disclosure, the user may be aware of what target has been recognized and whether his target of interest has been recognized. According to an embodiment of the present disclosure, the user may distinguish his target of interest from others, e.g., by highlighting, framing, or background-erasing the recognized target.

Figure 9:
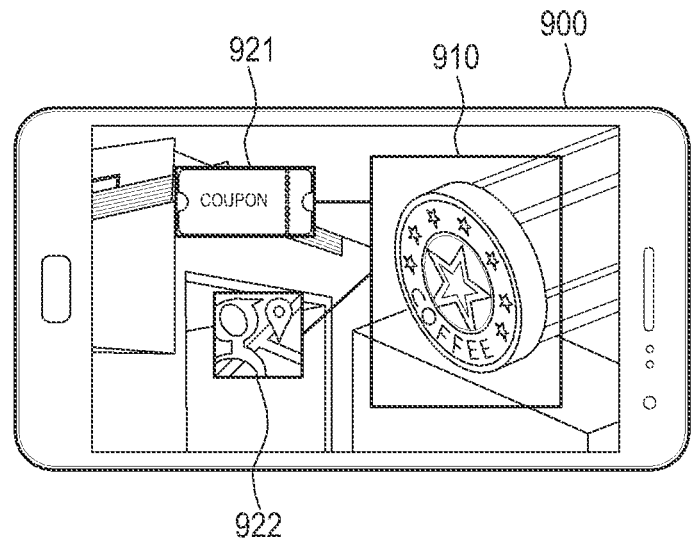
FIG. 9 is a view illustrating an example of displaying information associated with a recognized object according to an embodiment of the present disclosure.
Figure 10:
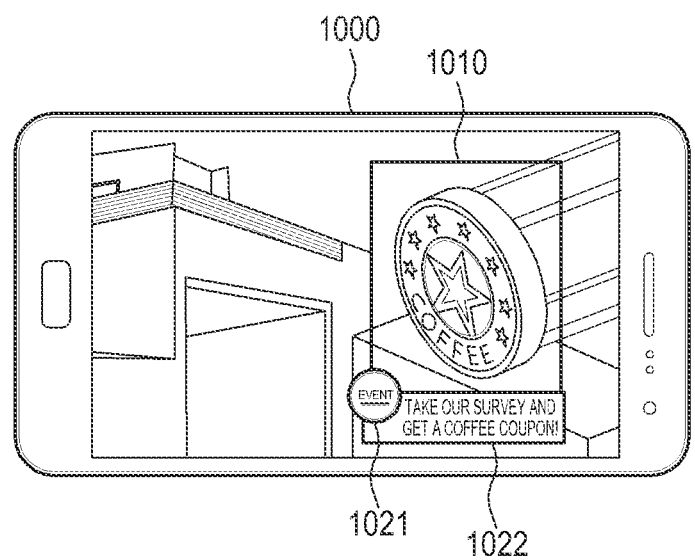
FIG. 10 is a view illustrating an example of displaying information associated with a recognized object according to an embodiment of the present disclosure.

FIGS. 9 and 10 are views illustrating exemplary methods of displaying information items associated with a recognized object, according to embodiments of the present disclosure.

According to an embodiment of the present disclosure, at least one or more services may be determined depending on a result of object recognition, and as many service type images as the number of services may be displayed on the screen. Service type image information items 921, 922, 1021, and 1022 generated for objects 910 and 1010 recognized by electronic devices 900 and 1000, respectively, may pop up in word balloons indicating the recognized object as shown in FIG. 9, or the information items may overlap the recognized object as shown in FIG. 10.

According to an embodiment of the present disclosure, at least one offerable service may be determined based on a result of recognizing an object, and the type of the determined service may be shown in the form of, e.g., an icon. Accordingly, the user may be aware of what services are available. As a result of determining the at least one offerable service, one or more available services may be shown, popping up in word balloons or overlaid, and the user may immediately identify and execute the services.

According to an embodiment of the present disclosure, information on each service (e.g., details of a coupon (e.g., indicating that the coupon is for buy-one-get-one-free promotion)) may be provided from an information providing server (e.g., a service provider), and in-depth information on the selected service may be offered. According to an embodiment of the present disclosure, specific information items on a service may be shown in a series of stages or stage-wise. At least one interim result of information may intervene until a final result of information is obtained. Depending on the depth of information the user desires to obtain, the service may be complete before the final result of information is obtained. Transfer of additional information may be determined by the information providing server.

According to an embodiment of the present disclosure, the information providing server may provide further segmented associated information as necessary. For example, partial information on the event the user may be interested in may be provided on the main screen as shown in FIG. 10, and when the information is selected, more detailed event information may be provided from the information providing server.

According to an embodiment of the present disclosure, the user, when presented with multiple service offers, may represent the services in different stages on the screen based on settings or pre-analyzed situations. For example, the services may be shown so that a major one of the recognized targets or a core service of the service provider may be more noticeable. As shown in FIG. 10, information on a current event among the information items associated with the coffee shop logo may be overlaid and mapped to the product image, thus making the information more noticeable and helping advertisement.

Figure 11:
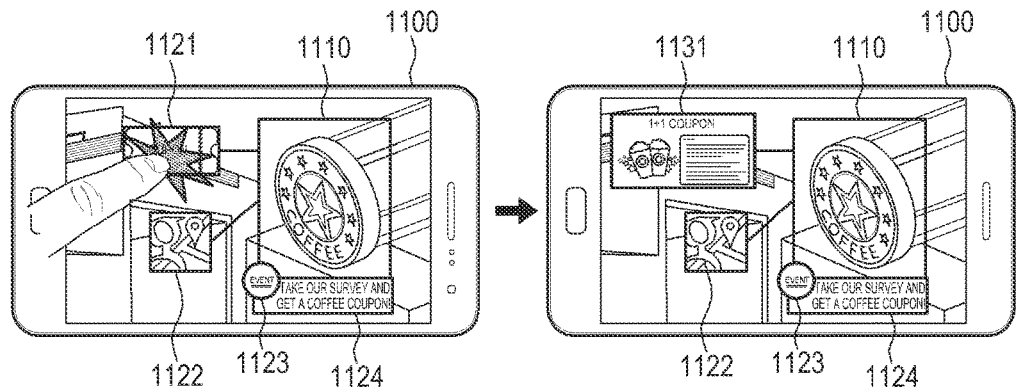
FIG. 11 is a view illustrating an example of providing information according to selection of information associated with a recognized object according to an embodiment of the present disclosure.
Figure 12:
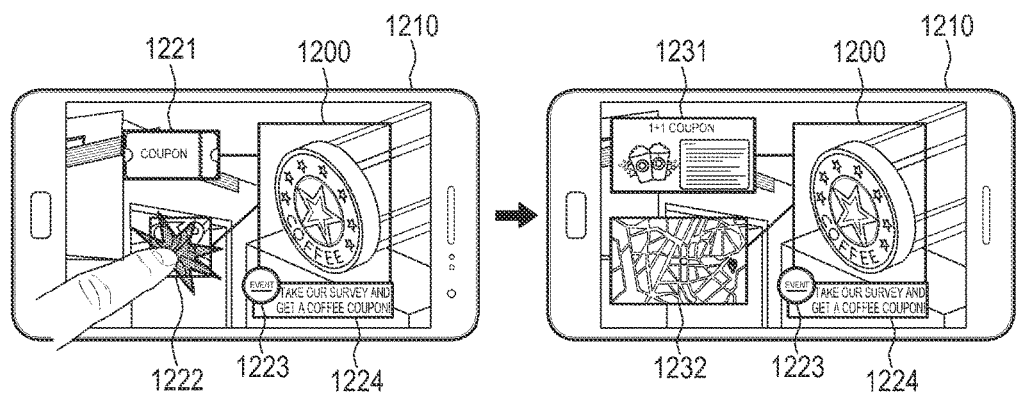
FIG. 12 is a view illustrating an example of providing information according to selection of information associated with a recognized object according to an embodiment of the present disclosure.

FIGS. 11 and 12 are views illustrating examples of stage-wise exploring of detailed information associated with a specific service.

According to embodiments of the present disclosure, referring to FIGS. 11 and 12, the user may adjust the stages of each, some, or all of multiple services shown on the screen. For example, when the user selects one of the multiple services, a next stage information item of the service may be provided as shown in FIG. 11, or when the user selects a recognized object, the respective next stage information items (e.g., secondary information items) of the multiple services associated with the recognized object may be simultaneously obtained as shown in FIG. 12.

According to an embodiment of the present disclosure, a plurality of information items 1121, 1122, 1123, and 1124 associated with an object 1110 recognized by an electronic device 1100 may be displayed in various forms. Upon selection of one 1121 of the plurality of information items associated with the recognized object 1110, detailed information 1131 regarding the selected information item 1121 may be displayed. According to an embodiment of the present disclosure, upon selection of some of the plurality of information items 1121, 1122, 1123, and 1124, detailed information 1131 regarding the selected information items 1121, 1122, 1123, and 1124 may be displayed.

According to an embodiment of the present disclosure, a plurality of information items 1221, 1222, 1223, and 1224 associated with an object 1210 recognized by an electronic device 1200 may be displayed in various forms as shown in FIG. 12. When the user selects the recognized object 1210, detailed information 1231 and 1232 regarding at least preselected one (e.g., coupon information or map information) of the plurality of information items 1221, 1222, 1223, and 1224 may be displayed.

According to an embodiment of the present disclosure, such adjustment of the stages of the services and selection of recognized object may be achieved in various ways, such as, e.g., touch, hovering, eye tracking, palm recognition, or gesture.

According to an embodiment of the present disclosure, a character string or text may be recognized from the recognized object, and a service associated therewith may be provided. For example, various services, such as dictionary or web searching, sending or searching emails, calling or searching calls, sending or searching text, copying, PIMS searching, or navigation searching, may be further offered through the recognized text. The pattern of the character string or text may be examined, and the character string or text may be enabled or disabled.

Figure 13:
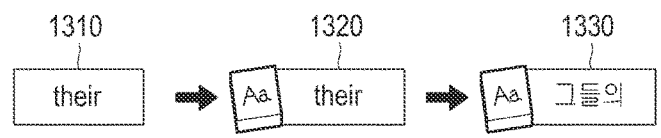
FIG. 13 is a view illustrating an example of displaying information associated with a recognized piece of text according to an embodiment of the present disclosure.

For example, in case the text recognition service is a dictionary searching service, a stage-wise changing UX may be shown as shown in FIG. 13. Specifically, a recognized piece of text 1310 may be shown and be determined for whether it has an error. An indication 1320 that a dictionary searching service is available for the recognized text may be then shown. Thereafter, a dictionary information provider may search his dictionary for the recognized text and may shown a search result 1330.

Figure 14:
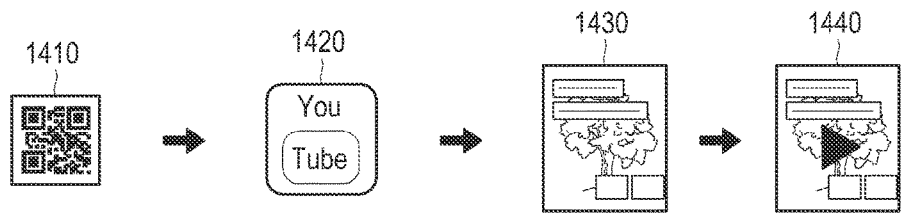
FIG. 14 is a view illustrating an example of displaying information associated with a recognized piece of text according to an embodiment of the present disclosure.

QR (Quick Response) codes frequently use their internal information URL. Referring to FIG. 14, according to an embodiment of the present disclosure, a stage-wise changing UX may be implemented for a recognized QR code by an Internet video streaming service provider.

For example, according to an embodiment of the present disclosure, the area 1410 of the QR code is displayed, and in case the URL of the QR code is addressed to Youtube Video™, an indication 1420 that a streaming service is available may be then displayed. Next, a thumbnail image 1430 of the corresponding video is displayed, and a sample video of the corresponding video (or the whole video) 1440 may be streamed.

According to an embodiment of the present disclosure, the user may receive information regarding the stage in which an object is recognized and a service is determined from the recognized object, and the user may perform his desired stage of a service.

Figure 15:
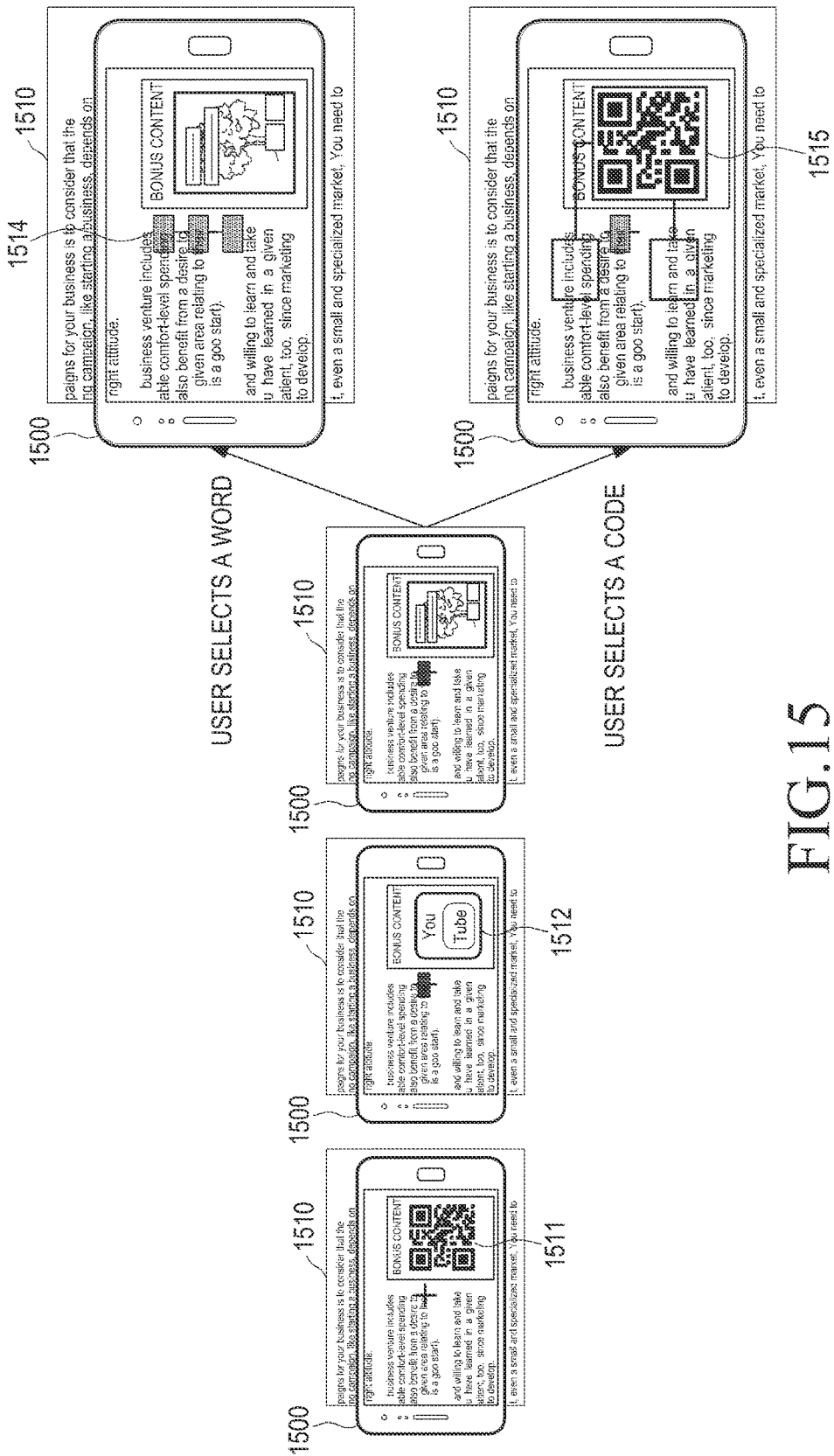
FIG. 15 is a view illustrating an example of displaying associated information on a plurality of recognized objects, according to an embodiment of the present disclosure.

FIG. 15 is a view illustrating an example of displaying associated information on a plurality of recognized objects, according to an embodiment of the present disclosure. According to an embodiment of the present disclosure, referring to FIG. 15, when a plurality of objects are recognized from an image displayed on the screen, at least one service type offerable for each recognized object may be provided. When the user selects a specific service for a specific recognized object, associated information or detailed information on the specific service may be provided. For example, when the user selects a word searching service as shown in FIG. 15, a dictionary searching service may be provided as shown in FIG. 13, and when the user selects a QR code analysis service as shown in FIG. 15, the video corresponding to a recognized QR code may be provided as shown in FIG. 14.

For example, according to an embodiment of the present disclosure, when at least part of a newspaper article 1510 is captured by an electronic device 1500, a QR code 1511 may be recognized. In case the URL of the QR code 1511 is addressed to Youtube Video™ 1512, an indication that a streaming service is available may be shown. In this case, when the user selects a word, a searching service for the selected word 1514 may be provided, and when the user selects a QR code 1515, information corresponding to the QR code may be provided as shown in FIG. 15.

FIG. 15 is a view illustrating an example of displaying associated information on a recognized document form, according to an embodiment of the present disclosure. When an embodiment of the present disclosure applies to an augmented reality service, each stage in a real-time changing recognized object may be recognized, and a service corresponding thereto may be provided, as shown in FIG. 16.

According to an embodiment of the present disclosure, the stage-by-stage recognition services may be provided from an external service providing server. An additional service may be configured based on a framework provided from an electronic device, and a service interworking with a recognition database (DB) may be configured. The services from the external service providing server may be provided in such a manner that a service selected through a resultant service or information is launched. According to an embodiment of the present disclosure, an external separate website or application may be downloaded in the electronic device to operate the services.

Figure 16:
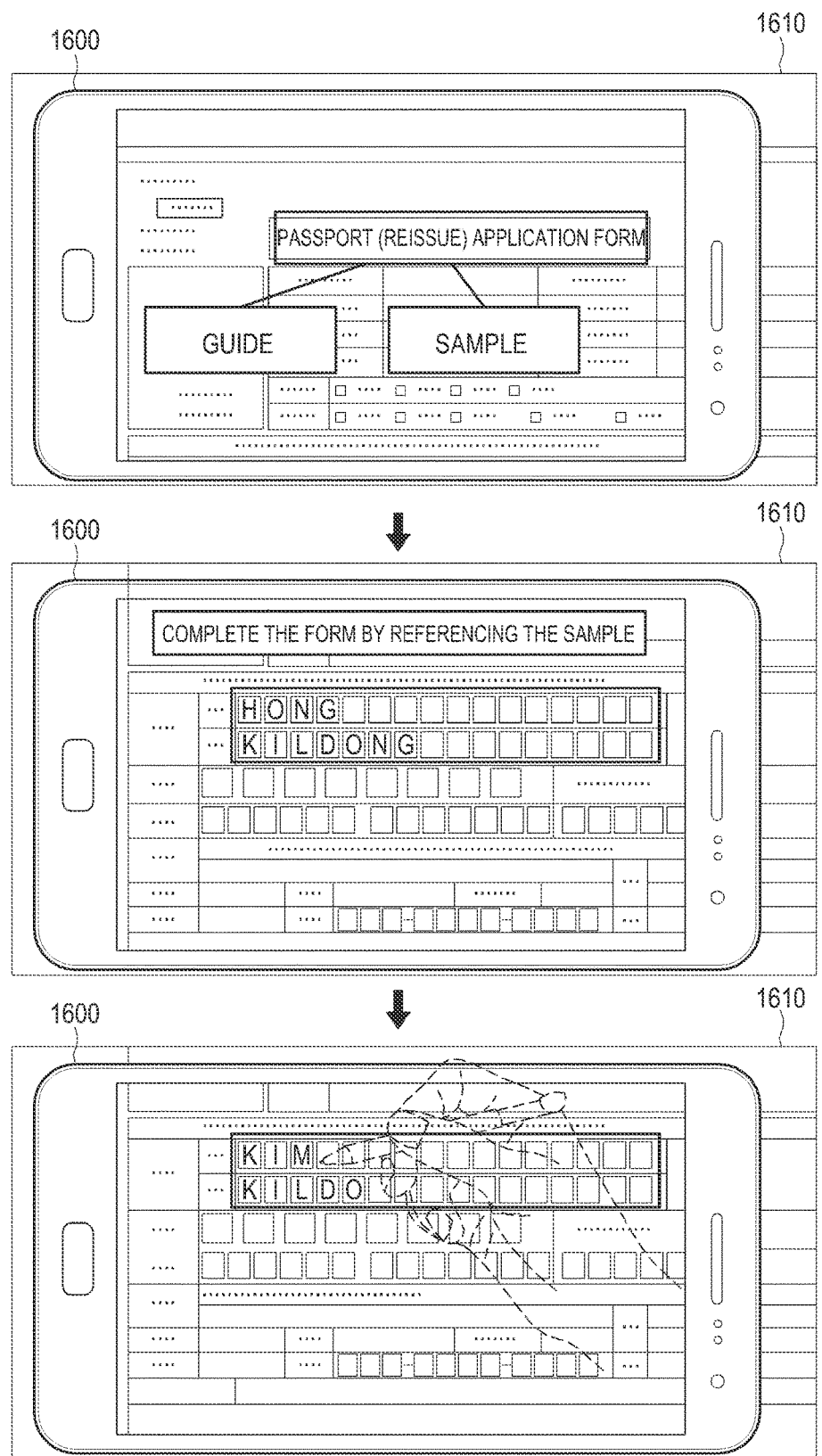
FIG. 16 is a view illustrating an example of displaying associated information on a recognized document form, according to an embodiment of the present disclosure.

For example, according to an embodiment of the present disclosure, various embodiments of the present disclosure may be applicable to a guide of how to fill in an application form, as shown in FIG. 16. For example, the external information providing server may provide a service in such a way to match a resultant service or information with an object currently recognized in reality and to provide an interaction therebetween.

According to an embodiment of the present disclosure, the user may use a fill-in guide that is available from, e.g., a public office. For example, when an electronic device 1600 recognizes a passport application form 1610 as an object, a guide or a sample may be displayed on the display unit of the electronic device as information types related to the passport application form 1610. For example, as a first stage of service (e.g., primary information items), a menu may be offered to select a guide as to how to fill in each item of the form and a sample. When the user selects the sample, a to-be-filled region of the object may be recognized and a sample may be shown in the region as a second stage of service, as shown in the second sub-view of FIG. 16.

When the user properly fills out the form 1610 by referencing the sample, the sample may be updated with changes made by the user as a third stage of service, as shown in the third sub-view of FIG. 16. The changed portion may be shown to be distinguished so that the changes have been made to the sample. For example, the first name and the second name in the sample shown in FIG. 16 may be subjected to the second stage of service and the third stage of service, respective, according to an embodiment of the present disclosure.

Figure 17:
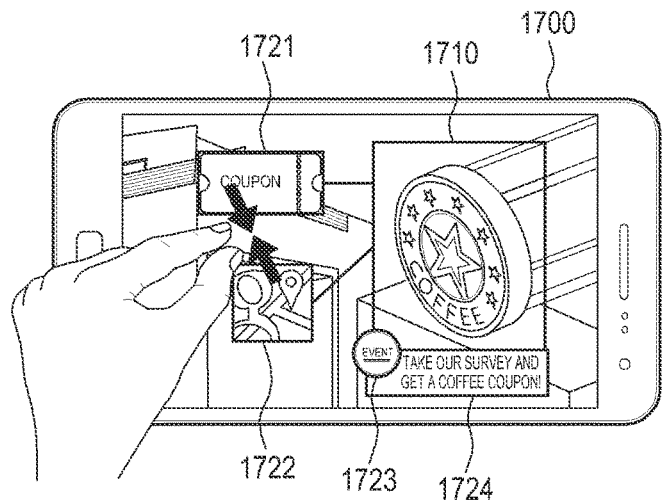
FIG. 17 is a view illustrating an example of displaying information associated with a combination of a plurality of recognized objects, according to an embodiment of the present disclosure.

FIG. 17 is a view illustrating a method of displaying additional services by mixing multiple services or recognized objects, according to an embodiment of the present disclosure According to an embodiment of the present disclosure, referring to FIG. 17, in case there are multiple services for a recognized target and multiple objects, a third service may be provided by making them interconnect with each other. For example, multiple services (e.g., a coupon service and an electronic map service) may be adapted to interwork with a recognized object, or multiple recognized targets may be adapted to interwork with each other by referencing the email address or QR code in a business card.

According to an embodiment of the present disclosure, in case there may be multiple services associated with each result of the recognition, the user may select a service to adjust or perform information stages of the selected service. The service selection may be done by recognizing the user's touch, click, gesture (finger tip recognition or eye tracking), hovering, orienting the recognized object in a predetermined direction, context awareness-based automation, or real-time shifting of the recognized object.

For example, referring to FIG. 17, a plurality of information items 1721, 1722, 1723, and 1724 associated with an object 1710 recognized by an electronic device 1700 may be displayed in various forms. According to an embodiment of the present disclosure, when the user makes a gesture (e.g., pinching) for gathering or combining the coupon information item 1721 and the map information item 1722, the user may be provided with a new additional information item (e.g., information regarding coupon services offered in the local community) obtained by combining the coupon information item and the map information item. For example, the coupon information item and the map information item may be combined with each other to provide a service as to the area where the coupon is available.

Figure 18:
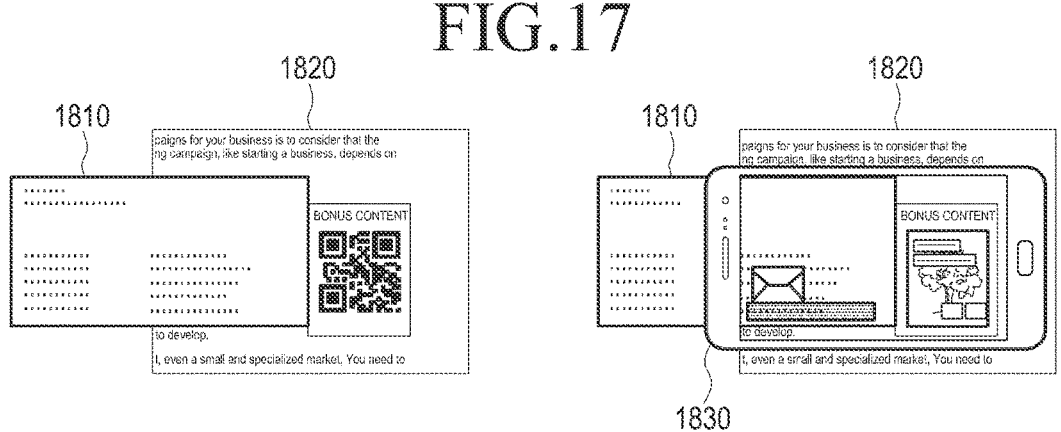
FIG. 18 is a view illustrating an example of recognizing a plurality of objects from a plurality of targets.
Figure 19:
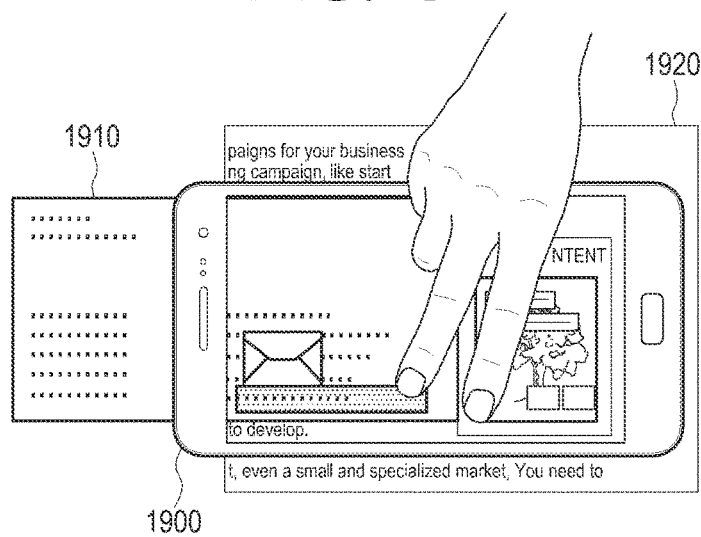
FIG. 19 is a view illustrating an example of displaying information associated with a combination of a plurality of recognized objects, according to an embodiment of the present disclosure.

Referring to FIGS. 18 and 19, according to an embodiment of the present disclosure, services determined from two recognized objects may be combined with each other.

According to an embodiment of the present disclosure, referring to FIG. 18, a business card 1810 may be overlaid on the article information 1820 including a QR code, and the QR code and the business card may be then simultaneously recognized by an electronic device 1830, and accordingly, the information extracted from the business card and the QR code may be combined to provide new additional information.

According to an embodiment of the present disclosure, referring to FIG. 19, a business card 1910 may be overlaid on the article information 1920 including a QR code, and the QR code and the business card may be simultaneously recognized by an electronic device 1930. In this case, when the user selects the email address in the business card and makes a gesture (e.g., pinching) for combination with the QR code, the information recognized from the QR code (e.g., information on bonus) may be transmitted to the selected email address. For example, content information (e.g., the URL information of video or the whole video) may be transferred to the email address in the business card as shown in FIG. 19.

The electronic device 101 may be any device with a display unit, and the electronic device 101 may, for example, be referred to as a camera, a portable device, a mobile terminal, a communication terminal, a portable communication terminal, or a portable mobile terminal. For example, the electronic device may be a digital camera, a smartphone, a mobile phone, a game player, a television (TV), a display, a vehicular head unit, a laptop computer, a tablet computer, a PMP (Personal Medial Player), a PDA (Personal Digital Assistant), a navigation device, an ATM, or a POS device, or the like. According to an embodiment of the present disclosure, the electronic device may be a flexible device or include a flexible display.

Figure 20:
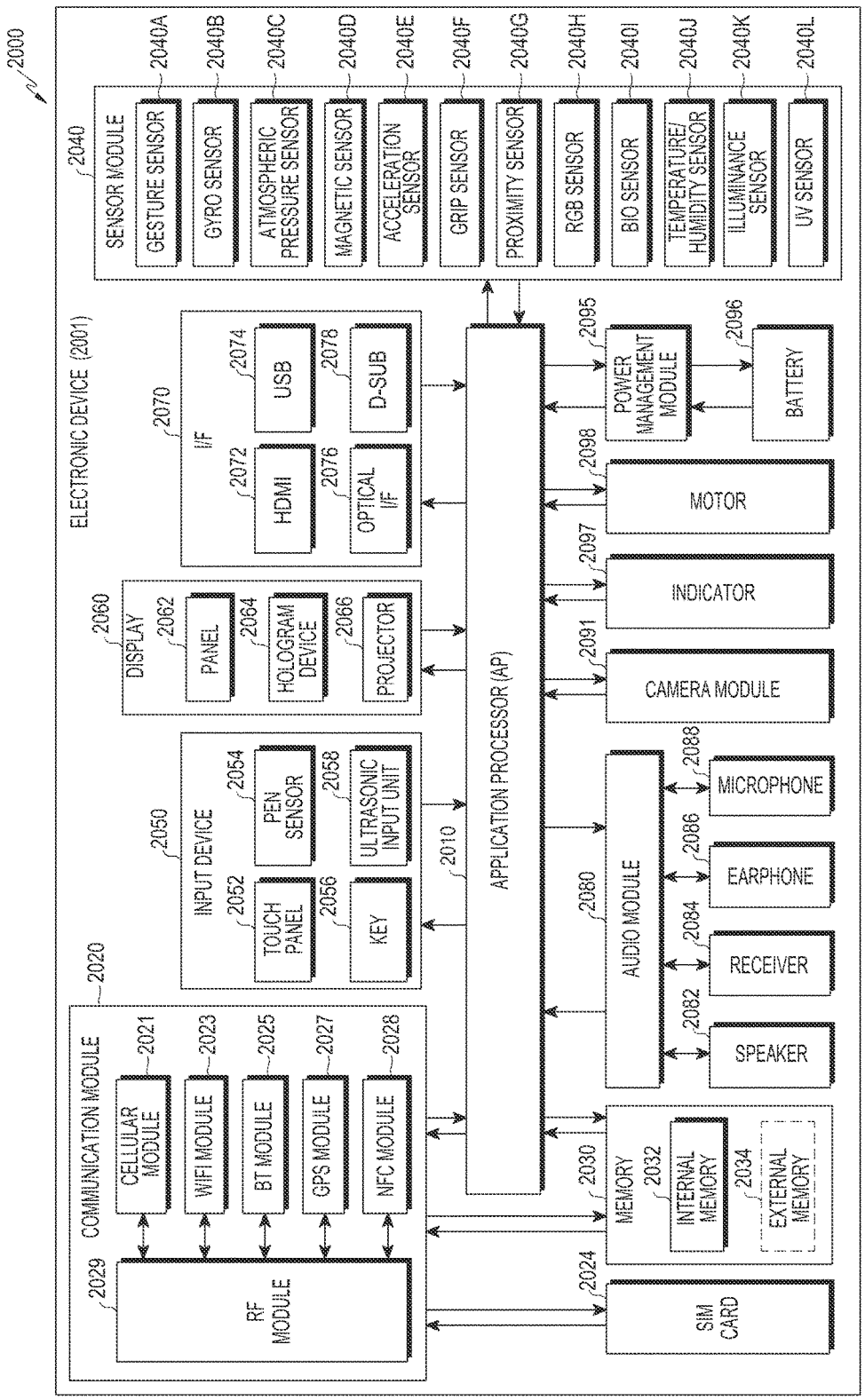
FIG. 20 is a block diagram illustrating a configuration of an electronic device according to an embodiment of the present disclosure.

FIG. 20 is a block diagram illustrating an electronic device 2001 according to an embodiment of the present disclosure. The electronic device 2001 may include the whole or part of the configuration of, e.g., the electronic device 101 shown in FIG. 1. Referring to FIG. 20, the electronic device 2001 may include one or more application processors (APs) 2010, a communication module 2020, an SIM (subscriber identification module) card 2024, a memory 2030, a sensor module 2040, an input device 2050, a display 2060, an interface 2070, an audio module 2080, a camera module 2091, a power management module 2095, a battery 2096, an indicator 2097, or a motor 2098.

The AP 2010 may control multiple hardware and software components connected to the AP 2010 by running an operating system or application programs, and the AP 2010 may process or compute various data including multimedia data. The AP 2010 may be implemented in, e.g., an SoC (System on Chip). According to an embodiment of the present disclosure, the AP 2010 may further include a GPU (graphic processing unit) (not shown).

The communication module 2020 (e.g. the communication interface 160) may perform data communication with other electronic devices (e.g., the electronic device 104 or the server 106) connected with the electronic device 2001 (e.g., the electronic device 101) via a network. According to an embodiment of the present disclosure, the communication module 2020 may include a cellular module 2021, a WiFi module 2023, a BT module 2025, a GPS module 2027, an NFC module 2028, or an RF (radio frequency) module 2029.

The cellular module 2021 may provide voice call, video call, text, or Internet services through a communication network (e.g., an LTE, LTE-A, CDMA, WCDMA, UMTS, WiBro, or GSM network). The cellular module 2021 may perform identification or authentication on the electronic device in the communication network using, e.g., a subscriber identification module (e.g., the SIM card 2024). According to an embodiment of the present disclosure, the cellular module 2021 may perform at least some of the functions providable by the AP 2010. For example, the cellular module 2021 may perform at least some of the multimedia control functions.

According to an embodiment of the present disclosure, the cellular module 2021 may include a communication processor (CP). The cellular module 2021 may be implemented in, e.g., an SoC (System on Chip). Although in FIG. 20 the cellular module 2021 (e.g., a communication processor), the memory 2030, or the power management module 2095 are provided separately from the AP 2010, the AP 2010 may be configured to include at least some (e.g., the cellular module 2021) of the above-listed components, according to an embodiment of the present disclosure.

According to an embodiment of the present disclosure, the AP 2010 or the cellular module 2021 (e.g., a communication processor) may load, in a volatile memory, commands or data received from a non-volatile memory or other component connected thereto and process the loaded commands or data. The AP 2010 or the cellular module 2021 may store, in the non-volatile memory, data received from other component(s) or data generated by the other component(s).

The WiFi module 2023, the BT module 2025, the GPS module 2027, or the NFC module 2028 may include a process for, e.g., processing data communicated through the module. Although in FIG. 20 the cellular module 2021, the WiFi module 2023, the BT module 2025, the GPS module 2027, and the NFC module 2028 are shown in their respective separate blocks, at least some (e.g., two or more) of the cellular module 2021, the WiFi module 2023, the BT module 2025, the GPS module 2027, and the NFC module 2028 may be included in a single integrated circuit (IC) or an IC package, according to an embodiment of the present disclosure. For example, at least some of the processors respectively corresponding to the cellular module 2021, the WiFi module 2023, the BT module 2025, the GPS module 2027, and the NFC module 2028 (e.g., the communication processor corresponding to the cellular module 2021 and the WiFi processor corresponding to the WiFi module 2023) may be implemented in a single SoC.

The RF module 2029 may communicate data, e.g., RF signals. The RF module 2029 may include, e.g., a transceiver, a PAM (power amp module), a frequency filter, or an LNA (low noise amplifier) (not shown). The RF module 2029 may further include parts (e.g., conductors or wires) for communicating radio waves in a free space upon performing wireless communication. Although in FIG. 20 the cellular module 2021, the WiFi module 2023, the BT module 2025, the GPS module 2027, and the NFC module 2028 share a single RF module 2029, the cellular module 2021, the WiFi module 2023, the BT module 2025, the GPS module 2027, or the NFC module 2028 may communicate RF signals through a separate RF module(s), according to an embodiment of the present disclosure.

The SIM card 2024 may include a subscriber identification module, and the SIM card 2024 may be inserted into a slot formed at a predetermined position of the electronic device. The SIM card 2024 may contain unique identification information (e.g., an ICCID (integrated circuit card identifier) or subscriber information (e.g., an IMSI (international mobile subscriber identity).

The memory 2030 (e.g., the memory 130) may include an internal memory 2032 or an external memory 2034. The internal memory 2032 may include, e.g., a volatile memory (e.g., a DRAM (dynamic RAM), an SRAM (static RAM), an SDRAM (synchronous dynamic RAM), etc.) or a non-volatile memory (e.g., an OTPROM (one time programmable ROM), a PROM (programmable ROM), an EPROM (erasable and programmable ROM), an EEPROM (electrically erasable and programmable ROM), a mask ROM, a flash ROM, a NAND flash memory, or a NOR flash memory).

According to an embodiment of the present disclosure, the internal memory 2032 may be an SSD (Solid State Drive). The external memory 2034 may include a flash drive, e.g., a CF (compact flash) memory, an SD (9secure digital) memory, a micro-SD memory, a min-SD memory, an xD (extreme digital) memory, or a Memory Stick™. The external memory 2034 may be functionally connected with the electronic device 2001 via various interfaces. According to an embodiment of the present disclosure, the electronic device 2001 may further include a storage device (or storage medium) such as a hard disk drive.

The sensor module 2040 may measure a physical quantity or detect an operational stage of the electronic device 2001, and the sensor module 2040 may convert the measured or detected information into an electrical signal. The sensor module 2040 may include, e.g., a gesture sensor 2040A, a gyro sensor 2040B, an atmospheric pressure sensor 2040C, a magnetic sensor 2040D, an acceleration sensor 2040E, a grip sensor 2040F, a proximity sensor 2040G, a color sensor 2040H such as an RGB (Red, Green, Blue) sensor, a bio sensor 2040I, a temperature/humidity sensor 2040J, an illumination sensor 2040K, or an Ultra Violet (UV) sensor 2040L. Additionally or alternatively, the sensor module 2040 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor which is not shown in the drawings. The sensor module 2040 may further include a control circuit for controlling at least one or more of the sensors included in the sensor module 2040.

The input unit 2050 may include a touch panel 2052, a (digital) pen sensor 2054, a key 2056, or an ultrasonic input device 2058. The touch panel 2052 may recognize touch inputs in at least one of capacitive, resistive, infrared, or ultrasonic methods. The touch panel 2052 may further include a control circuit. With the capacitive method, physical contact or proximity detection may be possible. The touch panel 2052 may further include a tactile layer. In this regard, the touch panel 2052 may provide the user with a tactile response.

The (digital) pen sensor 2054 may be implemented in a way identical or similar to e.g., how a touch input of a user is received, or by using a separate sheet for recognition. The key 2056 may include e.g., a physical button, optical key or key pad. The ultrasonic input device 2058 may use an input tool that generates an ultrasonic signal and enable the electronic device 2001 to determine data by sensing the ultrasonic signal to the microphone 2088, thereby enabling wireless recognition. According to an embodiment of the present disclosure, the electronic device 2001 may receive a user input from an external device, such as a computer or a server through the communication module 2020.

The display 2060 (corresponding to the display 150 of FIG. 1) may include a panel 2062, a hologram device 2064, or a projector 2066. The panel 2062 may be, e.g., a Liquid Crystal Display (LCD), Active Matrix Organic Light Emitting Diodes (AMOLEDs), or the like. The panel 2062 may be implemented to be flexible, transparent, or wearable. The panel 2062 may also be incorporated with the touch panel 2052 in a unit. The hologram device 2064 may make three dimensional (3D) images (holograms) in the air by using light interference. The projector 2066 may display an image by projecting light onto a screen. The screen may be, for example, located inside or outside of the electronic device 2001. In accordance with an embodiment, the display 2060 may further include a control circuit to control the panel 2062, the hologram device 2064, or the projector 2066.

The interface 2070 may include e.g., a High Definition Multimedia Interface (HDMI) 2072, a USB 2074, an optical interface 2076, or a D-subminiature (D-sub) 2078. The interface 2070 may be included in e.g., the communication interface 160 shown in FIG. 1. Additionally or alternatively, the interface 2070 may include a Mobile High-definition Link (MHL) interface, a secure digital (SD) card/multimedia card (MMC) interface, or IrDA standard interface.

The audio module 2080 may perform various processes (e.g., encoding or decoding) relating to converting a sound wave and audio signal to an electric signal or vice versa. At least a part of the audio module 2080 may be included in e.g., the electronic device 101 as shown in FIG. 1. The audio module 2080 may process sound information input or output through e.g., a speaker 2082, a receiver 2084, an earphone 2086, or a microphone 2088.

The camera module 2091 may be a device for capturing still images and videos, and may include, according to an embodiment of the present disclosure, one or more image sensors (e.g., front and back sensors), a lens, an Image Signal Processor (ISP), or a flash such as an LED or xenon lamp.

The power manager module 2095 may manage power of the electronic device 2001. Although not shown, e.g., a Power management Integrated Circuit (PMIC), a charger IC, or a battery or fuel gauge is included in the power manager module 2095.

The PMIC may be mounted on e.g., an IC or an SOC. A charging method may be divided into wired and wireless charging methods. The charger IC may charge a battery and prevent overvoltage or overcurrent from being induced from a charger. According to an embodiment of the present disclosure, the charger IC may be used in at least one of a cable charging scheme and a wireless charging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging.

The battery gauge may measure an amount of remaining power of the battery 2096, a voltage, a current, or a temperature while the battery 2096 is being charged. The battery 2096 may save or generate electricity, and supply power to the electronic device 2001 with the saved or generated electricity. The battery 2096 may include, e.g., a rechargeable battery or a solar battery.

The indicator 2097 may indicate a particular state of the electronic device 2001 or a part of the electronic device (e.g., the AP 2010), the particular state including e.g., a booting state, a message state, or charging state. The motor 2098 may convert electric signals to mechanical vibration. Although not shown, a processing unit for supporting mobile TV, such as a GPU may be included in the electronic device 2001. The processing unit for supporting mobile TV may process media data conforming to a standard for Digital Multimedia Broadcasting (DMB), Digital Video Broadcasting (DVB), or media flow.

Each of the aforementioned components of the electronic device may include one or more parts, and a name of the part may vary with a type of the electronic device. The electronic device in accordance with various embodiments of the present disclosure may include at lest one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

At least a part of the device (e.g., modules or their functions) or method (e.g., operations) may be implemented as instructions stored in a computer-readable storage medium e.g., in the form of a programming module. The instructions, when executed by one or more processor (e.g., the processor 120), may cause the processor to carry out a corresponding function. The computer-readable storage medium may be e.g., the memory 130. At least a part of the programming module may be implemented by e.g., the processor 120. At least a part of the programming module may include e.g., a module, program, routine, set of instructions, process, or the like for performing one or more functions.

The computer-readable storage medium may include a hardware device configured to store and perform program instructions (e.g., programming module), such as magnetic media such as hard discs, floppy discs, and magnetic tapes, optical media such as Compact Disc ROMs (CD-ROMs) and Digital Versatile Discs (DVDs), magneto-optical media such as floptical disks, ROMs, RAMs, Flash Memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to various embodiments of the present disclosure, commands stored in a storage medium may be configured to enable at least one processor to perform at least one operation, when the commands are executed by the at least one processor. The at least one operation may include an operation of recognizing at least one object from an image displayed on a screen of the electronic device, an operation of displaying at least one primary information item associated with the recognized object, and an operation of, when at least one of the at least one primary information item is selected, displaying a secondary information item associated with the selected primary information item on the screen.

As is apparent from the foregoing description, according to embodiments of the present disclosure, the user may easily identify information associated with an object recognized from an image displayed on the screen of an electronic device.

According to embodiments of the present disclosure, information available for each recognized object (e.g., information regarding a related service) may be displayed, and when a predetermined service is selected, detailed information corresponding to the selected service may be provided, which enables various user experiences (UXs).

The embodiments herein are provided merely for better understanding of the present disclosure, and the present disclosure should not be limited thereto or thereby. It should be appreciated by one of ordinary skill in the art that various changes in form or detail may be made to the embodiments without departing from the scope of the present disclosure defined by the following claims.

What is claimed is:

1. A method for providing information in an electronic device, the method comprising:

recognizing, by a processor of the electronic device, at least one object from an image displayed on a screen of a display of the electronic device;

displaying, on the screen, a plurality of primary information items associated with the recognized object;

based on detecting selection of one from among the plurality of primary information items, displaying, on the screen, along with any unselected primary information items, a first-type secondary information item associated with the selected primary information item; and based on detecting simultaneous selection of two or more from among the plurality of primary information items, generating a second-type secondary information item by combining two or more first-type secondary items associated with the two or more selected primary information items and displaying, on the screen, the second-type secondary information item along with any unselected primary information items.

2. The method of claim 1, wherein each of the first-type and second-type secondary information items is configured in plural stages, and wherein each respective stage of the plural stages is provided based on detecting selection of the respective stage.

3. The method of claim 1, wherein the selected one primary information item and the associated first-type secondary information item are simultaneously displayed on the same screen.

4. The method of claim 1, wherein the primary information items include at least one of a coupon, an event, an electronic map, a dictionary search, an email, copying, calling, a short message service, a web page, and navigation.

5. The method of claim 1, further comprising displaying the primary information items or associated first-type or second-type secondary information items in association with the recognized object.

6. The method of claim 5, wherein the association between the primary information items or associated first-type or second-type secondary information items and the recognized object is represented by a line that connects a respective primary information item and the recognized object, or connects a respective first-type or second-type secondary information item and the recognized object.

7. The method of claim 5, wherein the association between the primary information items or associated secondary information items and the recognized object is represented by displaying the primary information items or the first-type or second-type secondary information items to overlap the recognized object and at least a portion of the image.

8. The method of claim 1, wherein, when at least one of the two or more primary information items contains an email address, transmitting, to the email address, an information item corresponding to another of the two or more primary information items.

9. The method of claim 1, further comprising:
determining a variation in the recognized object; and
providing an information item configured corresponding to the variation.

10. The method of claim 1, wherein each primary information item represents a type of service related with the recognized object, each first-type secondary information item represents detailed information about the corresponding primary information item, and the second-type secondary information item represents detailed information generated by combining aspects of the corresponding two or more first-type secondary information items.

11. An electronic device, comprising
a display; and
a processor configured to:
recognize at least one object from an image displayed on a screen of the display;
display, on the screen, a plurality of primary information items associated with the recognized object;
based on detecting selection of one from among the plurality of primary information items, display, on the screen, along with any unselected primary information items, a first-type secondary information item associated with the selected primary information item; and
based on detecting simultaneous selection of two or more from among the plurality of the primary information items, generate a second-type secondary information item by combining two or more first-type secondary information items associated with the two or more selected primary information items and display, on the screen, the second-type secondary information item along with any unselected primary information items.

12. The electronic device of claim 11, wherein each of the first-type and second-type secondary information items is configured in plural stages, and wherein each respective stage of the plural stages is provided based on detecting selection of the respective stage.

13. The electronic device of claim 11, wherein the selected one primary information item and the associated first-type secondary information item are simultaneously displayed on the same screen.

14. The electronic device of claim 11, wherein the primary information items include at least one of a coupon, an event, an electronic map, a dictionary search, an email, copying, calling, a short message service, a web page, and navigation.

15. The electronic device of claim 11, wherein the processor is configured to display the primary information items or associated first-type or second-type secondary information items in association with the recognized object.

16. The electronic device of claim 15, wherein the processor is configured to represent the association between the primary information items or associated first-type or second-type secondary information items and the recognized object as a line that connects a respective primary information item and the recognized object, or connects a respective first-type or second-type secondary information item and the recognized object.

17. The electronic device of claim 15, wherein the processor is configured to represent the association between the primary information items or associated secondary information items and the recognized object by displaying the primary information items or the first-type or second-type secondary information items to overlap the recognized object and at least a portion of the image.

18. The electronic device of claim 11, wherein the processor is configured to, when at least one of the two or more primary information items contain an email address, transmit, to the email address, an information item corresponding to another of the two or more primary information items.

19. The electronic device of claim 11, wherein the processor is configured to determine a variation in the recognized object and provide an information item configured corresponding to the variation.

20. The electronic device of claim 11, wherein each primary information item represents a type of service related with the recognized object, each first-type secondary information item represents detailed information about the corresponding primary information item, and the second-type secondary information item represents detailed information generated by combining aspects of the corresponding two or more first-type secondary information items.

* * * * *